US012223839B1

(12) United States Patent
Ji et al.

(10) Patent No.: US 12,223,839 B1
(45) Date of Patent: Feb. 11, 2025

(54) TESTING METHOD FOR BLIND SPOT DETECTION SYSTEM FOR AUTOMOBILE, DEVICE, AND MEDIUM

(71) Applicants: CHINA AUTOMOTIVE TECHNOLOGY AND RESEARCH CENTER CO., LTD., Tianjin (CN); CATARC NEW ENERGY VEHICLE TEST CENTER (TIANJIN) CO., LTD., Tianjin (CN); CATARC AUTOMOTIVE TEST CENTER (TIANJIN) CO., LTD., Tianjin (CN)

(72) Inventors: Guotian Ji, Tianjin (CN); Jinfeng Gong, Tianjin (CN); Hang Sun, Tianjin (CN); Zhao Wang, Tianjin (CN); Hui Rong, Tianjin (CN); Xu Zhang, Tianjin (CN); Guangyu Zhang, Tianjin (CN); Guokai Jiang, Tianjin (CN); Yunlei Zhang, Tianjin (CN); Yan Fan, Tianjin (CN); Jiaxu Feng, Tianjin (CN); Hanbing Wu, Tianjin (CN); Liang Huang, Tianjin (CN); Jiarui Zhang, Tianjin (CN); Jingjing Hao, Tianjin (CN)

(73) Assignees: CHINA AUTOMOTIVE TECHNOLOGY AND RESEARCH CENTER CO., LTD., Tianjin (CN); CATARC NEW ENERGY VEHICLE TEST CENTER (TIANJIN) CO., LTD., Tianjin (CN); CATARC AUTOMOTIVE TEST CENTER (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 18/756,418

(22) Filed: Jun. 27, 2024

(30) Foreign Application Priority Data

Jan. 10, 2024 (CN) .......................... 202410032250.7

(51) Int. Cl.
G06F 11/34 (2006.01)
G08G 1/16 (2006.01)

(52) U.S. Cl.
CPC ......... *G08G 1/167* (2013.01); *G06F 11/3457* (2013.01)

(58) Field of Classification Search
CPC ................ B25J 9/1671; B60W 50/14; B60W 2050/143; B60W 2420/403;
(Continued)

(56) References Cited

U.S. PATENT DOCUMENTS

2016/0225276 A1* 8/2016 Harkness .................. G09B 9/00
2021/0097147 A1* 4/2021 DeVore .................. G06F 18/22
(Continued)

FOREIGN PATENT DOCUMENTS

CN 204188807 U 3/2015
CN 108445459 A 8/2018
(Continued)

OTHER PUBLICATIONS

First Office Action issued in counterpart Chinese Patent Application No. 202410032250.7, dated Feb. 26, 2024.

*Primary Examiner* — Abby Y Lin
*Assistant Examiner* — Hossam M Abd El Latif
(74) *Attorney, Agent, or Firm* — Westbridge IP LLC (57) ABSTRACT

A testing method for a blind spot detection system for an automobile includes: applying an electromagnetic interference signal to the tested automobile through an electromagnetic interference signal application device, meanwhile, simulating a static obstacle or a moving obstacle within a detection range through a testing device, and if the blind spot detection system for the tested automobile is activated, determining that the testing is passed. Repeatable and reproducible testing for the electromagnetic safety of the blind spot detection system may be realized.

7 Claims, 5 Drawing Sheets

(58) Field of Classification Search
CPC ........... B60W 2756/10; B60W 50/045; B60W 2420/408; G05B 19/048; G05B 9/00; G05B 9/05; G05B 9/54; G06F 11/3457; G06F 30/20; G06F 11/261; G06F 30/15; G06F 11/3672; G06F 30/27; G06F 3/04845; G06F 2200/1637; G06F 9/455; G08G 1/167; G01S 7/40; G01S 13/89; G01S 7/497; Y10S 901/02; Y10S 901/31
USPC ......................................................... 701/301
See application file for complete search history.

(56) References Cited

U.S. PATENT DOCUMENTS

| | | | |
|---|---|---|---|
| 2021/0197383 A1* | 7/2021 | Passot | G06V 20/10 |
| 2024/0176930 A1* | 5/2024 | Smith | G06F 30/23 |
| 2024/0232457 A1* | 7/2024 | Smith | G06F 11/3664 |
| 2024/0289514 A1* | 8/2024 | Bowman | B60W 60/0051 |

FOREIGN PATENT DOCUMENTS

| | | |
|---|---|---|
| CN | 108919215 A | 11/2018 |
| CN | 110457762 A | 11/2019 |
| CN | 110703629 A | 1/2020 |
| CN | 211234511 U | 8/2020 |
| CN | 211478956 U | 9/2020 |
| CN | 212321735 U | 1/2021 |
| CN | 112698318 A | 4/2021 |
| CN | 112946595 A | 6/2021 |
| CN | 113219419 A | 8/2021 |
| CN | 215866918 U | 2/2022 |
| CN | 115128553 A | 9/2022 |
| CN | 217587587 U | 10/2022 |
| CN | 115327498 A | 11/2022 |

\* cited by examiner

TESTING METHOD FOR BLIND SPOT DETECTION SYSTEM FOR AUTOMOBILE, DEVICE, AND MEDIUM

CROSS-REFERENCE TO RELATED APPLICATIONS

This application claims priority to Chinese Patent Application No. 202410032250.7, filed on Jan. 10, 2024, the content of which is incorporated herein by reference in its entirety.

TECHNICAL FIELD

The present application relates to the field of testing, and especially relates to a testing method for a blind spot detection system for an automobile, a device, and a medium.

BACKGROUND

Intelligent connected automobiles belong to the technical field that deeply integrates electronic technologies with automobiles, state information of the automobiles are obtained through different technical means such as perception and communication, and the automobiles are controlled through cooperation of a decision-making apparatus and an execution mechanism. With the increasing of the development degree of the intelligent connected automobiles, a millimeter wave radar, a laser radar, and a camera become important perception components for the automobile to perceive an external environment.

A blind spot detection system for an automobile detects automobiles, bicycles, etc. behind through installing the millimeter wave radars, etc., and an electronic control unit calculates and judges data of a perception unit. If an automobile or a bicycle is detected in a blind spot, a sound-light alarm sounds an alarm, and collision risk icons are displayed in rear-view mirrors with a flashing reminder. Due to the advantages of the blind spot detection (BSD) system in lane changing assistance during severe weather, nighttime driving, driver negligence, novice driving, etc., the system is generally equipped as a highlight of safety configuration in traditional automobiles and intelligent connected automobiles both domestically and internationally.

Meanwhile, an external electromagnetic environment in which the automobiles run is becoming increasingly complex, there are various types of electromagnetic interference signals in the spatial environment, and once the automobiles lose control due to electromagnetic interference, personal safety issues for drivers, passengers, and other users on the road are possibly caused. When the intelligent connected automobiles run on the road, driving safety issues should be fully considered, and electromagnetic compatibility safety is an important part therein. Once false alarm, wrong alarm, or non-alarm are caused because the electromagnetic interference affects the blind spot detection system for the automobile, judgment of the driver is interfered, and serious safety accidents are caused.

In view of this, the present application is proposed.

SUMMARY

In order to solve the above-mentioned technical problems, the present application provides a testing method for a blind spot detection system for an automobile, a device, and a medium, which lay a foundation for realizing consistency testing in a laboratory, a complete and flexible testing device and testing method are proposed, electromagnetic immunity testing for the blind spot detection system for the automobile is realized, and comprehensive testing and high testing accuracy may be realized. Repeatable and reproducible testing for the electromagnetic safety of the blind spot detection system may be realized, so as to judge the function and electromagnetic safety of the blind spot detection system.

The example of the present application provides a testing method for a blind spot detection system for an automobile, where a testing device is arranged in a manner of being associated with the tested automobile, the testing device is used for simulating an obstacle within a detection range, the detection range is a detection range of the blind spot detection system for the tested automobile, and the method includes:

a testing device is arranged in a manner of being associated with the tested automobile, the testing device is used for simulating an obstacle within a detection range, the detection range is a detection range of the blind spot detection system for the tested automobile, and the testing method includes the following steps:

S1, applying an electromagnetic interference signal to the tested automobile through an electromagnetic interference signal application device, meanwhile, simulating a static obstacle within the detection range through the testing device, and if the blind spot detection system for the tested automobile is activated, determining that the testing is passed; and S2, controlling the blind spot detection system to restore a standby state through a controller of the blind spot detection system, simulating a moving obstacle within the detection range through the testing device, and if the blind spot detection system for the tested automobile is activated, determining that the testing is passed.

The example of the present application provides an electronic device, and the electronic device includes:

a processor and a memory; and the processor is used for executing the steps of the testing method for the blind spot detection system for the automobile according to any one example through calling programs or instructions stored in the memory.

The example of the present application provides a computer-readable storage medium, where programs or instructions are stored in the computer-readable storage medium, and enable a computer to execute the steps of the testing method for the blind spot detection system for the automobile according to any one example.

The testing method for the blind spot detection system for the automobile, which is provided by the example of the present application, lays a foundation for realizing consistency testing in a laboratory, a complete and flexible testing device and testing method are proposed, electromagnetic immunity testing for the blind spot detection system for the automobile is realized, and comprehensive testing and high testing accuracy may be realized. Repeatable and reproducible testing for the electromagnetic safety of the blind spot detection system may be realized, so as to judge the function and electromagnetic safety of the blind spot detection system.

BRIEF DESCRIPTION OF DRAWINGS

In order to more clearly describe the technical solutions in the specific implementation manners of the present application or in the prior art, the drawings needing to be used in the description for the specific implementation manners

DETAILED DESCRIPTION OF THE EMBODIMENTS

In order to make the purpose, technical solutions and advantages of the present application clearer, the technical solutions of the present application will be clearly and completely described below. Apparently, the examples described are merely a part of examples rather than all examples of the present application. On the basis of the examples in the present application, all other examples obtained by those of ordinary skill in the art without creative efforts shall fall within the protection scope of the present application.

Due to visual blind spots existing in rear-view mirrors of an automobile, a driver cannot timely and accurately know movements of automobiles within the blind spots, and therefore, scratches or collisions during lane changing of the automobiles become a common type of traffic accident.

A blind spot detection system 04 detects moving automobiles within a certain range behind the automobile through two millimeter wave radars installed in a rear bumper of the automobile, and reminds the driver of the automobiles behind through warning lamps installed on rear-view mirrors, and if the driver turns on a turn signal lamp to change lanes at this moment, the system sounds an alarm and the warning lamp of the corresponding mirror flashes quickly to remind the driver of a risk in lane changing at this moment. Meanwhile, the millimeter wave radars are not affected by weather. Even if the driver cannot observe the surrounding situation through the blurred rear-view mirrors, the driver can still know whether there is a coming automobile or not from behind through the warning lamps installed on the mirrors. The blind spot detection system 04 can also help the driver develop a good habit of turning on the turn signal lamp, and know whether lane changing can be carried out or not through sound-light reminding. The blind spot detection system 04 nips accidents in the bud through actively reminding to avoid the occurrence of the accidents, so that the driving safety is greatly improved.

The example of the present application lays a foundation for realizing consistency testing in a laboratory, and proposes a complete and flexible testing method. Through arranging in an electromagnetic compatible darkroom and synchronously applying an electromagnetic interference signal, repeatable and reproducible testing for the electromagnetic safety of the blind spot detection system 04 may be realized, so as to judge the function and electromagnetic safety of the blind spot detection system.

Figure 1:
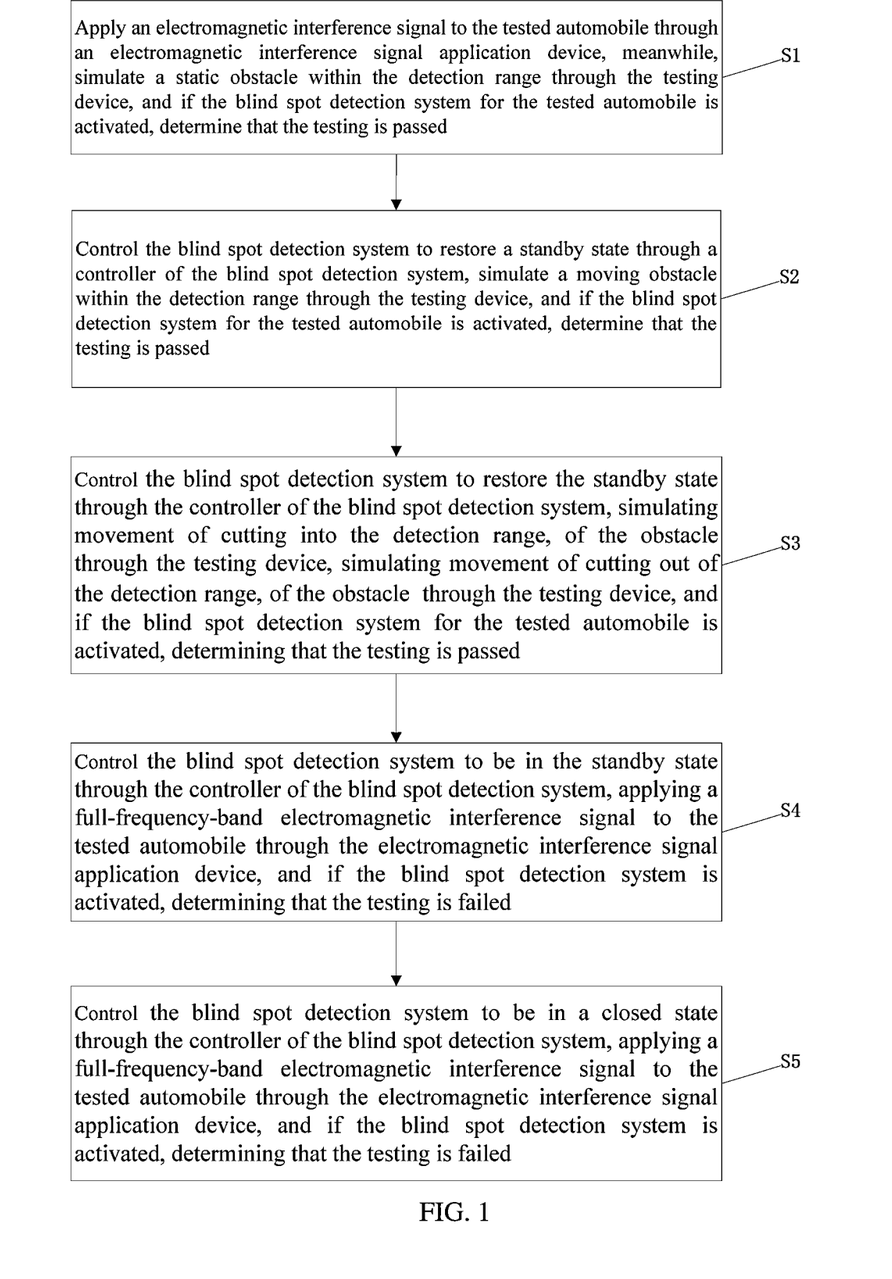
FIG. 1 is a schematic flow diagram of a testing method for a blind spot detection system for an automobile, which is provided by the example of the present application.
Figure 2A:
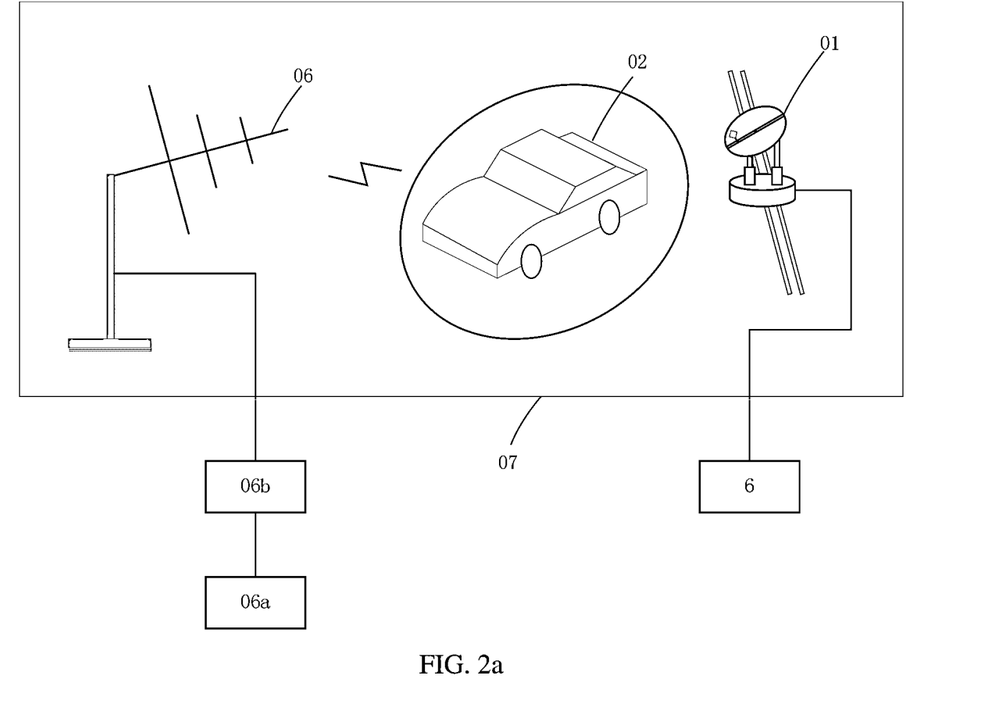
FIG. 2a is a schematic diagram of a blind spot detection system for an automobile, which is provided by the example of the present application.
Figure 2B:
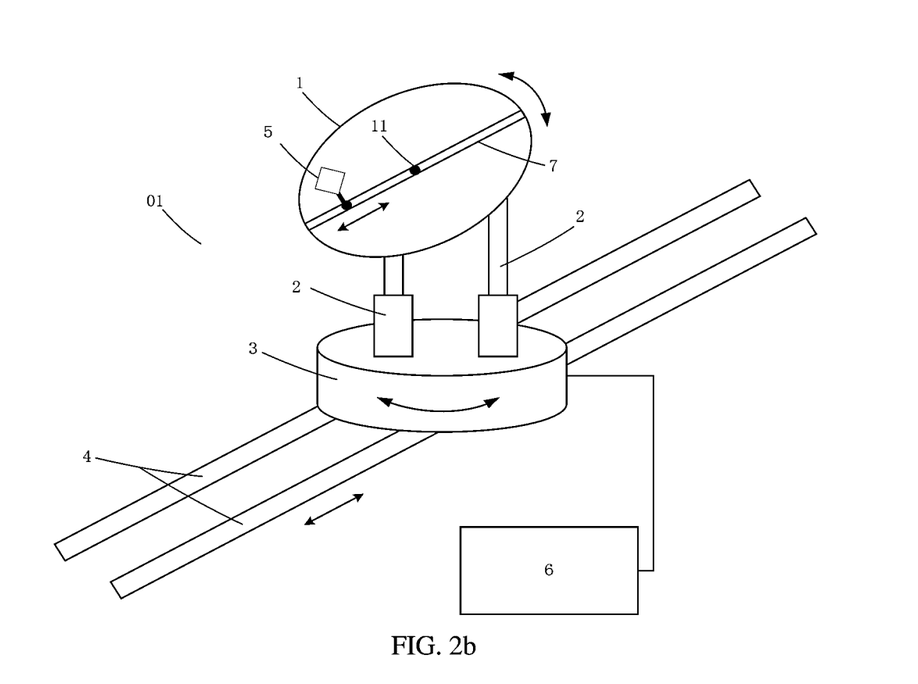
FIG. 2b is a schematic structure diagram of a testing device provided by the example of the present application.

Referring to FIG. 1, FIG. 2a, and FIG. 2b, a testing method for a blind spot detection system for an automobile includes the following steps.

S1, controlling a blind spot detection system 04 to be in a standby state through a controller 05 of the blind spot detection system, applying an electromagnetic interference signal to the tested automobile 02 through an electromagnetic interference signal application device 06, meanwhile, simulating a static obstacle within the detection range through the testing device 01, and if the blind spot detection system 04 for the tested automobile 02 is activated, determining that the testing is passed.

The simulating a static obstacle within the detection range through the testing device 01 includes: controlling a lifting arm 2 and a rotary table 3 to move through a controller 6 of the testing device, so that a laser beam emitted by a laser device 11 arranged at the center of a rotating platform 1 points to a horizontal plane where millimeter wave radar sensors 03 at the tail part of the tested automobile 02 are located, and controlling the rotating platform 1 to rotate until the lifting arm 2 and the rotary table 3 are controlled to be fixed when the laser beam emitted by the laser device 11 is aimed at the millimeter wave radar sensors 03, and controlling to turn off the laser device 11; and controlling the electromagnetic wave reflector 5 to carry out reciprocating movement along the slide rail 7 to realize simulation for in-situ linear movement of the obstacle, and/or, controlling the electromagnetic wave reflector 5 to be fixed at an eccentric position of the rotating platform 1, and meanwhile, controlling the rotating platform 1 to carry out circumferential movement at a preset speed to realize simulation for in-situ rotation of the obstacle, and/or, controlling the electromagnetic wave reflector 5 to carry out reciprocating movement along the slide rail 7 while controlling the rotating platform 1 to carry out circumferential movement at a preset speed to realize simulation for in-situ complex movement of the obstacle.

Particularly, for the blind spot detection system 04 capable of recognizing the static obstacle, testing may be carried out in a manner of simulating the static obstacle at a fixed point to activate the blind spot detection system 04, that is, the testing is carried out through the step S1 above.

Specifically, the testing device 01 is arranged in a manner of being associated with the tested automobile 02 (in the present case, the testing device 01 and the tested automobile 02 which are located in the same electromagnetic compatible darkroom 07 are referred to as the testing device 01 and the tested automobile 02 which are arranged in a manner of being associated, that is, the testing device 01 and the tested automobile 02 are located in the same electromagnetic compatible darkroom 07, with the purpose of allowing the testing device 01 to flexibly enter or leave away from the detection range of the blind spot detection system 04 for the tested automobile 02), the testing device 01 is used for simulating an obstacle within a detection range, and the detection range is the detection range of the blind spot detection system 04 for the tested automobile 02. For example, referring to the schematic structure diagram of a testing device 01 shown in FIG. 2b, the testing device 01 includes: an electromagnetic wave reflector 5, a slide rail 7, a driving apparatus (not shown in FIG. 2b), a rotating platform 1, a lifting arm 2, a rotary table 3, a guide rail 4, a controller 6, a laser device 11 and other key parts. The slide rail 7 is a straight slide rail that passes through the circle center O (the circle center may also be represented as the center) of the rotating platform 1, and the rotating platform 1 is capable of rotating around the point O. The lifting arm 2 is composed of a plurality of arms capable of being extended or shortened, with one end connected with the rotating platform 1 and the other end connected with the rotary table 3. An inclination angle of the rotating platform 1 may be adjusted through controlling the height of lifting arm 2. The rotary table 3 is installed on the guide rail 4, and is capable of realizing 360-degree rotation in the horizontal direction and then achieving the purpose of adjusting a horizontal pointing angle of the rotating platform 1, and meanwhile, the rotary table 3 is capable of sliding along the guide rail 4. The guide rail 4 is arranged behind the tested automobile 02, with the purpose of realizing simulation for the obstacle within the detection range. The controller 6 is used for controlling the rotary table 3 to slide along the guide rail 4, controlling the rotary table 3 to rotate, controlling the lifting arm 2 to ascend and descend, controlling a rotation mode (continuous rotation, fixed-angle rotation, etc.), a rotation speed, etc. of the rotating platform 1, and controlling movement of the electromagnetic wave reflector 5 along the slide rail 7. The laser device 11 is vertically installed at the center point O of the rotating platform 1, and capable of being used for observing an approximate range covered by the rotating platform 1.

Figure 3:
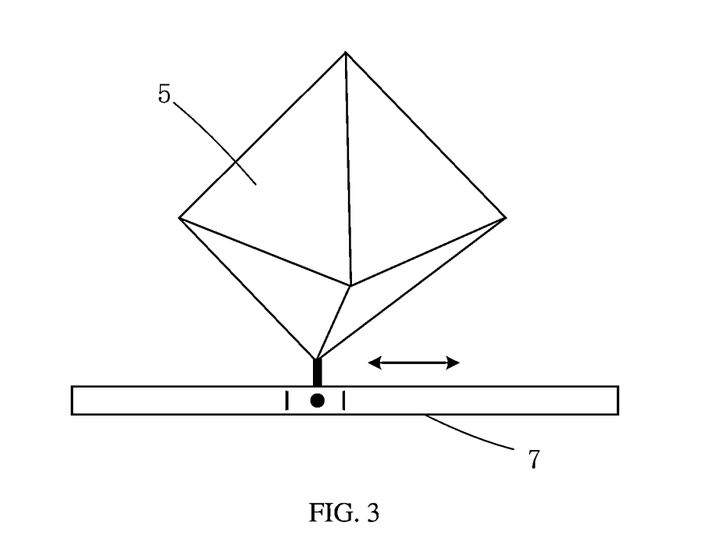
FIG. 3 is a schematic structure diagram of an electromagnetic wave reflector provided by the example of the present application.

The electromagnetic wave reflector 5 is composed of eight cubic corners, and capable of realizing electromagnetic wave reflection in any direction of incoming waves, and the electromagnetic wave reflector 5 is installed on the slide rail 7 through a certain connection apparatus. For example, referring to the schematic structure diagram of an electromagnetic wave reflector 5 shown in FIG. 3, the electromagnetic wave reflector 5 includes eight cubic corners, that is, the electromagnetic wave reflector 5 is an octahedron, with four triangles on top and four triangles on bottom, namely eight reflection surfaces, and the electromagnetic wave reflector 5 may be driven to move on the slide rail 7 through a driving apparatus. The electromagnetic wave reflector 5 is capable of reflecting multi-directional electromagnetic wave interference signals through arranging eight reflection surfaces, suitable for various automobile models with uncertain installation positions of the millimeter wave radars, and capable of ensuring the application effect of the electromagnetic wave interference signals, so that improvement for the reliability of a testing result is benefited.

Figure 5:
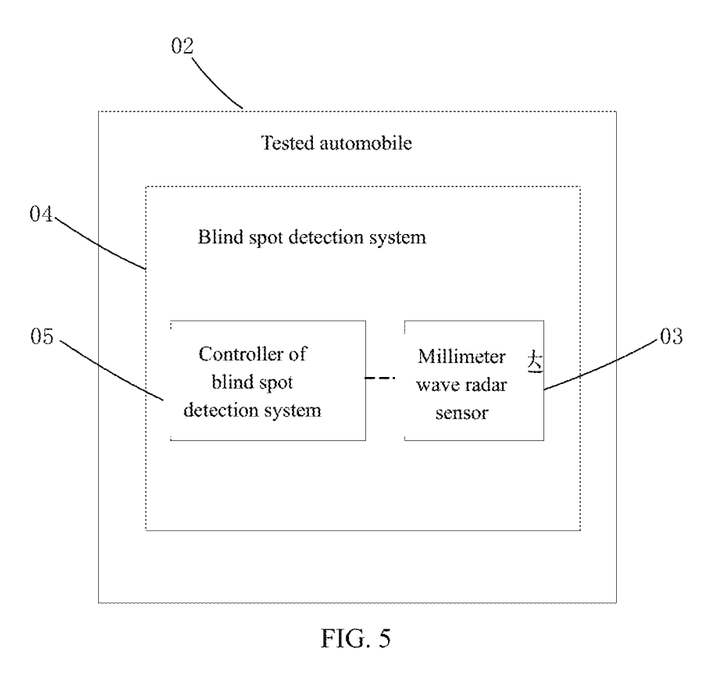
FIG. 5 is a schematic structure diagram of a blind spot detection system for a tested automobile, which is provided by the example of the present application.

As shown in FIG. 5, the blind spot detection system 04 for the tested automobile 02 includes a controller 05 of the blind spot detection system, and millimeter wave radar sensors 03. The principle of activating the blind spot detection system in the example is: a laser transmitter and a laser receiver are arranged in the millimeter wave radar sensor 03, when pulse laser emitted by the laser transmitter hits the obstacle within the detection range, light scattering is formed on the surface of the obstacle, a part of light waves is reflected onto the laser receiver, and the laser receiver converts a received light signal into an electrical signal and transfers the electrical signal to the controller 05 of the blind spot detection system. If the controller 05 of the blind spot detection system is affected by electromagnetic interference and does not receive the electrical signal sent by the laser receiver, the activation for the blind spot detection system 04 is failed; and if the controller 05 of the blind spot detection system is not affected by electromagnetic interference and receives the electrical signal sent by the laser receiver, the blind spot detection system 04 is activated.

In addition, the obstacle in the testing process for the blind spot detection system may be a common obstacle or the electromagnetic wave reflector 5 (i.e., a multi-faced mirror) used in the example, however, a diffuse reflection phenomenon of the common obstacle may not reflect the received light waves onto the laser receivers of the millimeter wave radar sensors 03, moreover, the emphasis of the present case is to carry out testing for the blind spot detection system on the obstacle located at the boundary of the blind spot, and the volume of the obstacle is required to be small, and therefore, in the example, the common obstacle is replaced by the electromagnetic wave reflector 5, so that a good reflection effect is achieved, and the volume may be designed to be small.

Alternatively, the electromagnetic wave reflector 5 does not rotate along with the rotation of the rotating platform 1 while being located at the circle center O of the rotating platform 1, and when the electromagnetic wave reflector 5 moves on the slide rail 7, if the rotating platform 1 also rotates synchronously, the electromagnetic wave reflector 5 carries out eccentric movement, and is capable of simulating the in-situ movement of the obstacle.

In addition, as shown in FIG. 2*a*, the electromagnetic interference signal application device 06 is further sequentially connected with a power amplifier 06*b*, the power amplifier 06*b* is connected with a signal source 06*a*, and the signal source 06*a* and the power amplifier 06*b* are both located outside the electromagnetic compatible darkroom 07, so that operating personnel are facilitated to emit electromagnetic interference signals with different intensities by the signal source 06*a*. In addition, the controller 6 of the testing device is also located outside the electromagnetic compatible darkroom 07, so that the operating personnel are benefited to operate the controller 6 of the testing device.

S2, controlling the blind spot detection system 04 to restore a standby state through a controller 05 of the blind spot detection system, simulating a moving obstacle within the detection range through the testing device 01, and if the blind spot detection system 04 for the tested automobile 02 is activated, determining that the testing is passed.

The simulating a moving obstacle within the detection range through the testing device 01 includes: controlling the lifting arm 2 and the rotary table 3 to move through the controller of the testing device 01, so that a laser beam emitted by the laser device 11 arranged at the center of a rotating platform 1 points to the horizontal plane where the millimeter wave radar sensors 03 at the tail part of the tested automobile 02 are located, and controlling the rotating platform 1 to rotate until the lifting arm 2 and the rotary table 3 are controlled to be fixed when the laser beam emitted by the laser device 11 is aimed at the millimeter wave radar sensors 03; and controlling the electromagnetic wave reflector 5 to carry out reciprocating movement along the slide rail 7 to realize simulation for in-situ linear movement of the obstacle, and/or, controlling the electromagnetic wave reflector 5 to be fixed at an eccentric position of the rotating platform 1, and meanwhile, controlling the rotating platform 1 to carry out circumferential movement at a preset speed to realize simulation for in-situ rotation of the obstacle, and/or, controlling the electromagnetic wave reflector 5 to carry out reciprocating movement along the slide rail 7 while controlling the rotating platform 1 to carry out circumferential movement at a preset speed to realize simulation for in-situ complex movement of the obstacle.

Particularly, for the blind spot detection system 04 incapable of recognizing the static obstacle, the blind spot detection system 04 may be activated through the function of simulating the in-situ movement of the obstacle at the fixed point, that is, the activation is carried out through the step S2 above.

Further, the controlling the electromagnetic wave reflector 5 to be fixed at an eccentric position of the rotating platform 1, and meanwhile, controlling the rotating platform 1 to carry out circumferential movement at a preset speed to realize simulation for in-situ rotation of the obstacle includes:

when the number of circles of the rotating platform 1 carrying out circumferential movement at a preset speed reaches a set value, adjusting the eccentric position to simulate different movement amplitudes of the obstacle.

The adjusting the eccentric position includes:

sequentially adjusting the eccentric position in ascending order according to a distance from the center of the rotating platform 1, and in the process, observing whether the blind spot detection system 04 is activated or not, so that testing for the sensitivity and stability of the blind spot detection system 04 may be realized.

Further, the testing method further includes:

S3, controlling the blind spot detection system 04 to restore the standby state through the controller 05 of the blind spot detection system, simulating movement of cutting into the detection range, of the obstacle through the testing device 01, simulating movement of cutting out of the detection range, of the obstacle through the testing device, and if the blind spot detection system 04 for the tested automobile 02 is activated, determining that the testing is passed; and the simulating movement of cutting into the detection range, of the obstacle through the testing device 01, and simulating movement of cutting out of the detection range, of the obstacle through the testing device includes:

controlling the lifting arm 2 and the rotary table 3 to move through the controller 6 of the testing device, so that a laser beam emitted by the laser device 11 arranged at the center of the rotating platform 1 points to the horizontal plane where the millimeter wave radar sensors 03 at the tail part of the tested automobile 02 are located, and controlling the rotary table 3 to slide on the guide rail 4 to realize simulation for movement of cutting in or cutting out of the detection range, of the obstacle.

Further, the detection range may be determined through testing of the testing device 01, or may be provided by an automobile manufacturer. Specifically, the determining the detection range through the testing device 01 (i.e., judging whether the rotary table 3 of the testing device 01 is within the detection range or not) includes:

in the case that the electromagnetic interference signal application device 06 does not apply an electromagnetic interference signal to the tested automobile 02, arranging the guide rail 4 at a preset position, controlling the lifting arm 2 to ascend a preset height through the controller 6 of the testing device, controlling the rotary table 3 to move on the guide rail 4, and/or controlling the rotating platform 1 to carry out circumferential movement at a preset speed, and in the process, observing whether the blind spot detection system 04 is activated or not, if the blind spot detection system 04 is activated, determining the current position of the rotary table 3 to belong to the detection range, and if the blind spot detection system 04 is not activated within a preset time length, adjusting the preset position is adjusted, and repeating the above process.

Figure 4:
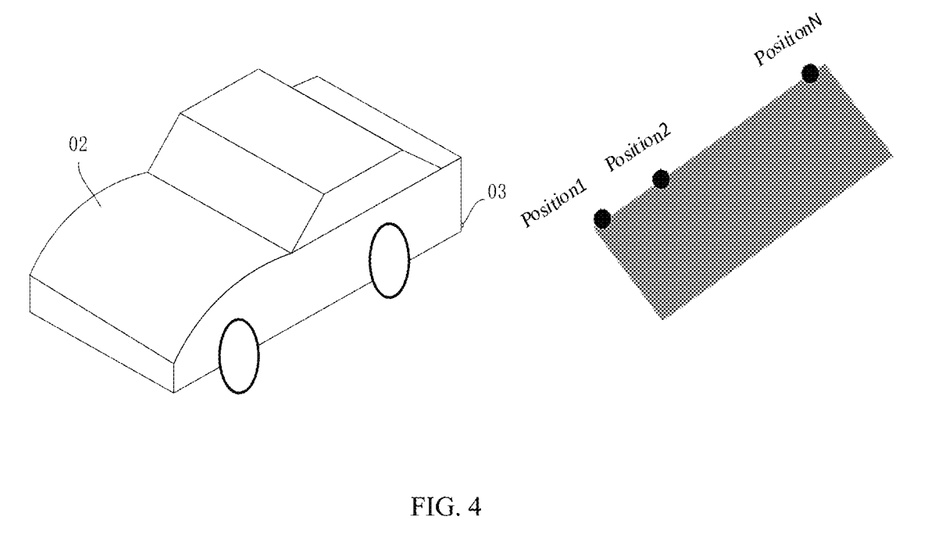
FIG. 4 is a schematic diagram of a detection range provided by the example of the present application.

It may be understood that, the millimeter wave radars of the blind spot detection system 04 are usually installed at the tail part of the automobile, so that the detection range is rectangular areas in rear parts of the both sides of the tail part of the automobile, and therefore, the preset position of the guide rail 4 may be determined on the basis of the detection range. If the detection range is provided by the automobile manufacturer, the testing device 01 may be controlled to move along the edges of the rectangular areas (as shown in FIG. 4, the rectangular area represents a detection range, where a position 1, a position 2, and a position N may be different positions that the rotary table 3 moves to within the detection range), and whether the blind spot detection system 04 is activated or not is tested, so that the testing purpose is realized.

Further, the applying an electromagnetic interference signal to the tested automobile 02 through an electromagnetic interference signal application device 06 includes:

applying an electromagnetic interference signal to the tested automobile 02 at sixteen characteristic frequency points respectively through the electromagnetic interference signal application device 06.

The sixteen characteristic frequency points respectively are: 27 MHz, 45 MHZ, 65 MHZ, 90 MHz, 120 MHz, 150 MHz, 190 MHz, 230 MHZ, 280 MHz, 380 MHz, 450 MHZ, 600 MHZ, 750 MHz, 900 MHZ, 1300 MHZ, and 1800 MHZ, the field intensity of the electromagnetic interference signal is 30V/m, and the duration of applying the electromagnetic interference signal at each characteristic frequency point is greater than a threshold value.

Further, the testing method further includes:

S4, controlling the blind spot detection system 04 to be in the standby state through the controller 05 of the blind spot detection system, applying a full-frequency-band electromagnetic interference signal to the tested automobile 02 through the electromagnetic interference signal application device 06, and in the case of no obstacle within the detection range, if the blind spot detection system 04 is activated (for example, a warning signal is lighted up), determining that the testing is failed; and the full frequency band is 20 MHz to 2000 MHz.

S5, controlling the blind spot detection system 04 to be in a closed state through the controller 05 of the blind spot detection system, applying a full-frequency-band electromagnetic interference signal to the tested automobile 02 through the electromagnetic interference signal application device 06, and if the blind spot detection system 04 is activated, determining that the testing is failed.

The above steps S4 and S5 show abnormal situations of the testing for the blind spot detection system, where in the step S4, the blind spot detection system 04 is in the standby state, if there is an obstacle within the detection range, the blind spot detection system 04 can be activated, and it indicates that the blind spot detection system 04 is not interfered by an electromagnetic interference signal; and if there is no obstacle within the detection range, and the blind spot detection system 04 is still activated, the activation is a false activation, and it indicates that the testing is ineffective, or also known as a testing failure. In the step S5, the blind spot detection system 04 is in a closed state, regardless of whether there is an obstacle within the detection range or not, the blind spot detection system 04 cannot be activated, if the blind spot detection system 04 is activated in the closed state, the activation is a false activation, and it indicates that the testing is ineffective, or also known as a testing failure.

Alternatively, when the above testing method is executed, the tested automobile 02 and the testing device 01 may be arranged in an anechoic chamber, so that the testing accuracy and stability are improved.

The applying an electromagnetic interference signal to the tested automobile 02 specifically may be exposing the tested automobile 02 to a vertically-polarized electromagnetic radiation field with a frequency range of 20 MHz to 2000 MHz. The electromagnetic signal may be modulated according to the following regulations: AM (amplitude modulation): an applicable frequency range is 20 MHz to 800 MHz, modulation frequency is 1 kHz, and a modulation depth is 80%; and PM (pulse modulation): an applicable frequency range is 800 MHz to 2000 MHz, a pulse width is 577 µs, and a cycle is 4600 µs.

The frequency step size (logarithmic or linear) of each frequency band is not greater than values in provisions in Table 1 below.

TABLE 1

Frequency Step Size

| Frequency range MHz | Linear step size MHz | Logarithmic compensation % |
|---|---|---|
| 20 ≤ f ≤ 200 | 5 | 5 |
| 200 < f ≤ 400 | 10 | 5 |
| 400 < f ≤ 1000 | 20 | 2 |
| 1000 < f ≤ 2000 | 40 | 2 |

The testing method for the blind spot detection system for the automobile, which is provided by the example of the present application, lays a foundation for realizing consistency testing in a laboratory, a complete and flexible testing device 01 and testing method are proposed, electromagnetic immunity testing for the blind spot detection system 04 for the automobile is realized, and comprehensive testing and high testing accuracy may be realized. Repeatable and reproducible testing for the electromagnetic safety of the blind spot detection system 04 may be realized, so as to judge the function and electromagnetic safety of the blind spot detection system.

Figure 6:
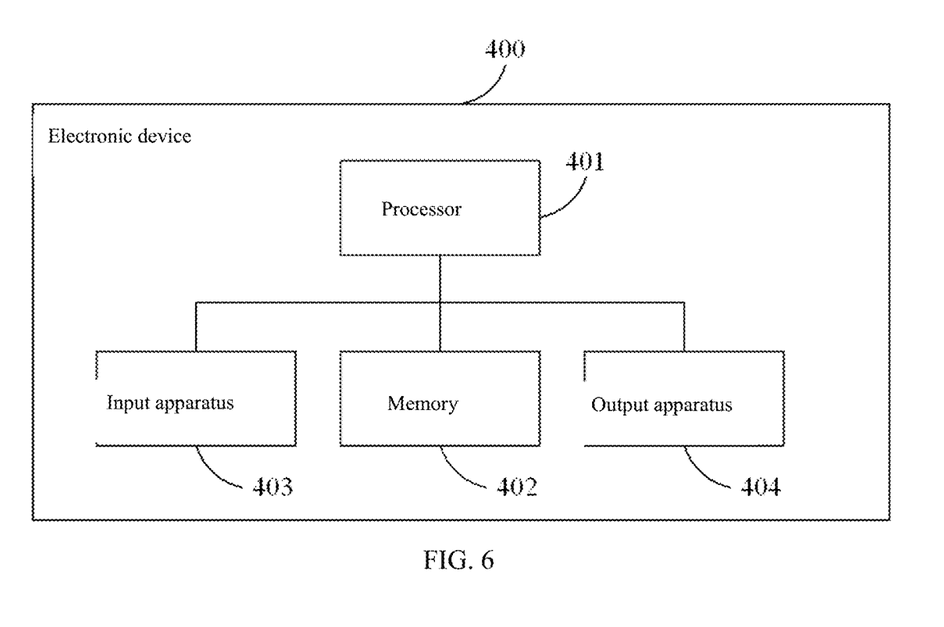
FIG. 6 is a schematic structure diagram of an electronic device provided by the example of the present application.

FIG. 6 is a schematic structure diagram of an electronic device provided by the example of the present application. As shown in FIG. 5, the electronic device 400 includes one or more processors 401, and a memory 402.

The processor 401 may be a central processing unit (CPU) or processing unit in other forms and with data processing capability and/or instruction execution capability, and may control other assemblies in the electronic device 400 to execute desired functions.

The memory 402 may include one or more computer program products, and the computer program products may include computer-readable storage medium in various forms, such as volatile memories and/or non-volatile memories. The volatile memories may include, for example, a random access memory (RAM) and/or a cache memory, etc. The non-volatile memories may include, for example, a read-only memory (ROM), a hard disk, a flash memory, etc. One or more computer program instructions may be stored in the computer-readable storage medium, and the processor 401 may run the program instructions to realize the testing method for a blind spot detection system for an automobile according to any example of the present application, and/or other desired functions. Various contents such as initial extrinsic parameters and threshold values may also be stored in the computer-readable storage medium.

In an instance, the electronic device 400 may further include: an input apparatus 403 and an output apparatus 404, and these assemblies are interconnected through a bus system and/or connection mechanisms in other forms (not shown). The input apparatus 403 may include, for example, a keyboard, a mouse, etc. The output apparatus 404 may output various information including early-warning prompt information, a braking force, etc. to the outside. The output apparatus 404 may include, for example, a display, a loudspeaker, a printer, a communication network and a connected remote output device thereof, etc.

Certainly, for simplicity, only some of the assemblies related to the present application in the electronic device 400 are shown in FIG. 5, and assemblies such as a bus and an input/output interface are omitted. In addition, according to the specific application situations, the electronic device 400 may further include any other appropriate assemblies.

In addition to the above method and device, the example of the present application may further provide a computer program product, the computer program product includes computer program instructions, and when the computer program instructions are run by a processor, the processor is enabled to execute the steps of the testing method for a blind spot detection system for an automobile, which is provided by any example of the present application.

Program codes for executing the operations in the example of the present application may be written by the computer program product in one or any combination of more programming languages, and the programming languages include object-oriented programming languages such as Java and C++, and further include conventional procedural programming languages such as 'C' language or similar programming languages. The program codes may be completely executed in a computing device of a user, partially executed in a user device, executed as an independent software package, partially executed in a computing device of a user and partially executed in a remote computing device, or completely executed in a remote computing device or a server.

In addition, the example of the present application may further provide a computer-readable storage medium, computer program instructions are stored in the computer-readable storage medium, and when the computer program instructions are run by a processor, the processor is enabled to execute the steps of the testing method for a blind spot detection system for an automobile, which is provided by any example of the present application.

One or any combination of more readable media may be adopted as the computer-readable storage medium. The readable medium may be a readable signal medium or a readable storage medium. The readable storage medium may include, but is not limited to, an electronic, magnetic, optical, electromagnetic, infrared, or semiconductor system, apparatus, or element, or any combination of the above. More specific instances (non-exhaustive list) of the readable storage medium include: an electrical connector with one or more conductive wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage element, a magnetic storage element, or any suitable combination of the above.

It needs to be noted that, the terms used in the present application are merely intended to describe the specific examples and not to limit the scope of the present application. As shown in the specification of the present application, unless exceptions are indicated explicitly in the context, words such as 'one', 'one piece', 'one kind', and/or 'the' may not specifically refer to the singular, but may also include the plural. The terms 'include', 'contain', or any other variations thereof are intended to cover non-exclusive inclusions, so that a process, a method or a device that includes a series of factors not only includes those factors, but further includes other factors that are not listed explicitly, or further includes factors inherent to the process, the method, or the device. In the absence of more limitations, a factor defined by the statement 'including a . . . ' does not exclude the existence of other same factors in the process, the method, or the device that includes the factor.

It further needs to be noted that, orientations or positional relationships indicated by the terms 'center', 'upper', 'lower', 'left', 'right', 'vertical', 'horizontal', 'inner', 'outer', etc. are based on orientations or positional relationships shown in the drawings, merely aim to facilitate the description for the present application and simplify the description, do not indicate or imply that the referred apparatuses or elements must be provided with specific orientations, and constructed and operated in the specific orientations, and therefore should not be understood as limitations on the present application. Unless otherwise explicitly specified and defined, the terms 'installation', 'connecting', 'connection', etc. should be broadly understood, for example, as fixed connection, detachable connection or integral connection; may be mechanical connection or electrical connection; and may be direct connection, indirect connection through an intermediary medium or communication between interiors of two elements. For those of ordinary skill in the art, the specific meanings of the above terms in the present application may be understood according to the specific situations.

Finally, it should be noted that: the above examples are merely used for illustrating the technical solutions of the present application, but not limit them; although the present application has been described in detail with reference to the foregoing examples, those of ordinary skill in the art should understand that: the technical solutions recorded in the foregoing examples may still be modified, or a part or all of the technical features therein may be equivalently substituted; however, these modifications or substitutions do not separate the essence of the corresponding technical solutions from the technical solutions of the examples of the present application.

What is claimed is:

1. A testing method for a blind spot detection system for an automobile, wherein a testing device is arranged in a manner of being associated with a tested automobile, the testing device is used for simulating an obstacle within a detection range, the detection range is a detection range of the blind spot detection system for the tested automobile, and the testing method comprises following steps:

S1, applying an electromagnetic interference signal to the tested automobile through an electromagnetic interference signal application device, meanwhile, simulating a static obstacle within the detection range through the testing device, and if the blind spot detection system for the tested automobile is activated, determining that the testing is passed;

wherein the simulating a static obstacle within the detection range through the testing device comprises: controlling a lifting arm and a rotary table to move through a controller of the testing device, so that a laser beam emitted by a laser device arranged at a center of a rotating platform points to a horizontal plane where millimeter wave radar sensors at a tail part of the tested automobile are located, and controlling the rotating platform to rotate until the rotating platform, the lifting arm and the rotary table are controlled to be fixed when the laser beam emitted by the laser device is aimed at the millimeter wave radar sensors, the millimeter wave radar sensors being components in the blind spot detection system, and used for sensing the obstacle, one end of the lifting arm being connected with the rotating platform, the other end of the lifting arm being connected with the rotary table, a slide rail penetrating through the center of the rotating platform being arranged on the rotating platform, an electromagnetic wave reflector which comprises eight reflection surfaces being arranged on the slide rail, the electromagnetic wave reflector being used for reflecting electromagnetic waves in a space, and the rotary table being arranged on a guide rail; and S2, controlling the blind spot detection system to restore a standby state through a controller of the blind spot detection system, simulating a moving obstacle within the detection range through the testing device, and if the blind spot detection system for the tested automobile is activated, determining that the testing is passed;

wherein the simulating a moving obstacle within the detection range through the testing device comprises: controlling the lifting arm and the rotary table to move through the controller of the testing device, so that a laser beam emitted by the laser device arranged at the center of the rotating platform points to the horizontal plane where the millimeter wave radar sensors at the tail part of the tested automobile are located, and controlling the rotating platform to rotate until the lifting arm and the rotary table are controlled to be fixed when the laser beam emitted by the laser device is aimed at the millimeter wave radar sensors; controlling the electromagnetic wave reflector to carry out reciprocating movement along the slide rail to realize simulation for in-situ linear movement of the obstacle, controlling the electromagnetic wave reflector to be fixed at an eccentric position of the rotating platform, and meanwhile, controlling the rotating platform to carry out circumferential movement at a preset speed to realize simulation for in-situ rotation of the obstacle, and controlling the electromagnetic wave reflector to carry out reciprocating movement along the slide rail while controlling the rotating platform to carry out circumferential movement at a preset speed to realize simulation for in-situ complex movement of the obstacle;

wherein the controlling the electromagnetic wave reflector to be fixed at an eccentric position of the rotating platform, and meanwhile, controlling the rotating platform to carry out circumferential movement at a preset speed to realize simulation for in-situ rotation of the obstacle comprises:

when the number of circles of the rotating platform carrying out circumferential movement at a preset speed reaches a set value, adjusting the eccentric position to simulate different movement amplitudes of the obstacle;

wherein the adjusting the eccentric position comprises:
sequentially adjusting the eccentric position in ascending order according to a distance from the center of the rotating platform;
wherein the determining the detection range through the testing device comprises:
arranging the guide rail at a preset position, controlling the lifting arm to ascend a preset height through the controller of the testing device, controlling the rotary table to move on the guide rail, and/or controlling the rotating platform to carry out circumferential movement at a preset speed, if the blind spot detection system is activated, determining that the current position of the rotary table belongs to the detection range, and if the blind spot detection system is not activated within a preset time length, adjusting the preset position.

2. The testing method for the blind spot detection system for the automobile according to claim 1, further comprising:
S3, controlling the blind spot detection system to restore the standby state through the controller of the blind spot detection system, simulating movement of cutting into the detection range, of the obstacle through the testing device, simulating movement of cutting out of the detection range, of the obstacle through the testing device, and if the blind spot detection system for the tested automobile is activated, determining that the testing is passed;
wherein the simulating movement of cutting into the detection range, of the obstacle through the testing device, and simulating movement of cutting out of the detection range, of the obstacle through the testing device comprises:
controlling the lifting arm and the rotary table to move through the controller of the testing device, so that a laser beam emitted by the laser device arranged at the center of the rotating platform points to the horizontal plane where the millimeter wave radar sensors at the tail part of the tested automobile are located, and controlling the rotary table to slide on the guide rail to realize simulation for movement of cutting in or cutting out of the detection range, of the obstacle.

3. The testing method for the blind spot detection system for the automobile according to claim 1, wherein the applying an electromagnetic interference signal to the tested automobile through an electromagnetic interference signal application device comprises:
applying an electromagnetic interference signal to the tested automobile at sixteen characteristic frequency points respectively through the electromagnetic interference signal application device.

4. The testing method for the blind spot detection system for the automobile according to claim 3, wherein the sixteen characteristic frequency points respectively are: 27 MHz, 45 MHZ, 65 MHz, 90 MHz, 120 MHz, 150 MHz, 190 MHz, 230 MHz, 280 MHz, 380 MHz, 450 MHz, 600 MHz, 750 MHz, 900 MHz, 1300 MHz, and 1800 MHZ, the field intensity of the electromagnetic interference signal is 30V/m, and the duration of applying the electromagnetic interference signal at each characteristic frequency point is greater than a threshold value.

5. The testing method for the blind spot detection system for the automobile according to claim 1, further comprising:
S4, controlling the blind spot detection system to be in the standby state through the controller of the blind spot detection system, applying a full-frequency-band electromagnetic interference signal to the tested automobile through the electromagnetic interference signal application device, and if the blind spot detection system is activated, determining that the testing is failed; and a full frequency band is 20 MHz to 2000 MHz; and
S5, controlling the blind spot detection system to be in a closed state through the controller of the blind spot detection system, applying a full-frequency-band electromagnetic interference signal to the tested automobile through the electromagnetic interference signal application device, and if the blind spot detection system is activated, determining that the testing is failed.

6. An electronic device, comprising:
a processor and a memory;
wherein the processor is used for executing the steps of the testing method for the blind spot detection system for the automobile according to claim 1 through calling programs or instructions stored in the memory.

7. A non-transitory computer-readable storage medium, wherein programs or instructions are stored in the computer-readable storage medium, and enable a computer to execute the steps of the testing method for the blind spot detection system for the automobile according to claim 1.

* * * * *